(12) United States Patent
     Ogasahara et al.

(10) Patent No.: US 12,624,403 B2
(45) Date of Patent: May 12, 2026

(54) OPTIMAL CALCULATION METHOD OF ENERGY OPERATING CONDITION IN IRON MILL, OPTIMAL CALCULATION DEVICE OF ENERGY OPERATING CONDITION IN IRON MILL, AND RUNNING METHOD OF IRON MILL

(71) Applicant: JFE STEEL CORPORATION, Tokyo (JP)

(72) Inventors: Tomoyoshi Ogasahara, Tokyo (JP); Masahiro Uno, Tokyo (JP); Koji Yoshihara, Tokyo (JP); Kazushige Yatsu, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 747 days.

(21) Appl. No.: 17/913,634

(22) PCT Filed: Mar. 16, 2021

(86) PCT No.: PCT/JP2021/010615
     § 371 (c)(1),
     (2) Date: Sep. 22, 2022

(87) PCT Pub. No.: WO2021/200118
     PCT Pub. Date: Oct. 7, 2021

(65) Prior Publication Data
     US 2023/0151447 A1     May 18, 2023

(30) Foreign Application Priority Data
     Mar. 31, 2020     (JP) ................................. 2020-062922

(51) Int. Cl.
     *C21B 5/00*       (2006.01)
     *C21B 7/24*       (2006.01)
     *G05B 13/02*      (2006.01)
     *G05B 19/418*     (2006.01)
     *G05B 23/02*      (2006.01)
     *G06Q 50/04*      (2012.01)

(52) U.S. Cl.
     CPC ................ *C21B 5/006* (2013.01); *C21B 7/24* (2013.01); *G05B 13/02* (2013.01); *G05B 19/418* (2013.01);
     (Continued)

(58) Field of Classification Search
     CPC .. C21B 5/006; C21B 7/00; C21B 7/24; C21B 2300/04; G05B 13/02; G05B 19/418;
     (Continued)

(56) References Cited

U.S. PATENT DOCUMENTS

| | | | |
|---|---|---|---|
| 6,745,109 B2 * | 6/2004 | Kojima | G06Q 50/06 |
| | | | 700/286 |
| 10,747,213 B2 * | 8/2020 | Ryu | G05B 19/41885 |

(Continued)

FOREIGN PATENT DOCUMENTS

| | | |
|---|---|---|
| CN | 104392334 A | 3/2015 |
| CN | 105814504 A | 7/2016 |

(Continued)

OTHER PUBLICATIONS

Aug. 22, 2023 extended Search Report issued in European Patent Application No. 21780211.5.

(Continued)

*Primary Examiner* — Robert E Fennema
(74) *Attorney, Agent, or Firm* — Oliff PLC

(57)     ABSTRACT

An optimal calculation method of an energy operating condition in an iron mill includes calculating, using a total energy operation cost of the iron mill within a predetermined period of time from a current time as an evaluation function, an operation condition of an energy facility in the iron mill as a decision variable such that a value of the evaluation function decreases, at each predetermined time within the predetermined period of time, based on actual values and estimated values of a generation amount and a used amount (Continued)

of energy utility for each of factories comprised in the iron mill. The method includes a step of calculating the decision variable by imposing an equality constraint such that the decision variable related to a power generation facility included in the energy facility is constant within a predetermined aggregation time.

4 Claims, 4 Drawing Sheets

(52) U.S. Cl.
CPC ......... *G05B 23/0294* (2013.01); *G06Q 50/04*
(2013.01); *C21B 2300/04* (2013.01)

(58) Field of Classification Search
CPC ........ G05B 23/0294; G05B 2219/2639; G06Q
10/04; G06Q 10/063; G06Q 50/04; G06Q
50/06; Y02P 90/02; Y02P 90/30
See application file for complete search history.

(56) References Cited

U.S. PATENT DOCUMENTS

| | | | | |
|---|---|---|---|---|
| 2011/0231320 A1* | 9/2011 | Irving | .................... | G06Q 30/08 |
| | | | | 713/300 |
| 2018/0088616 A1* | 3/2018 | Aggarwal | .............. | G06Q 50/06 |

FOREIGN PATENT DOCUMENTS

| JP | H01-109401 | A | 4/1989 |
|---|---|---|---|
| JP | 2001-101253 | A | 4/2001 |
| JP | 2004-171548 | A | 6/2004 |
| JP | 2012-014372 | A | 1/2012 |
| JP | 5862839 | B2 | 2/2016 |
| KR | 10-2016-0086913 | A | 7/2016 |
| WO | 2015/093262 | A1 | 6/2015 |

OTHER PUBLICATIONS

Castro, P.M., "Resource-Task Network Formulations for Industrial Demand Side Management of a Steel Plant," Ind. Eng. Chem. Res., vol. 52, pp. 13046-13058, 2013.

Jan. 21, 2025 Office Action issued in Chinese Patent Application No. 202180021930.3.

Jun. 1, 2021 International Search Report issued in International Patent Application No. PCT/JP2021/010615.

Zeng, Yujiao et al., "A novel multi-period mixed-integer linear optimization model for optimal distribution of byproduct gases, steam and power in an iron and steel plant", Energy, vol. 143, pp. 881-899, 2018.

Nov. 4, 2024 Office Action issued in Korean Patent Application No. 10-2022-7032645.

* cited by examiner (a)

(b)

OPTIMAL CALCULATION METHOD OF ENERGY OPERATING CONDITION IN IRON MILL, OPTIMAL CALCULATION DEVICE OF ENERGY OPERATING CONDITION IN IRON MILL, AND RUNNING METHOD OF IRON MILL

FIELD

The present invention relates to an optimal calculation method of the energy operating condition in an iron mill, an optimal calculation device of the energy operating condition in an iron mill, and a running method of an iron mill.

BACKGROUND

In general, iron mills include a large number of factories and a plurality of power generation facilities from upper processes (blast furnaces, coke ovens, steelmaking processes, etc.) to lower processes (rolling processes, surface treatment processes, etc.), and the following energy (gas, steam, and power) operation is performed.

That is, B gas (blast furnace gas) generated in a blast furnace, C gas (coke oven gas) generated in a coke oven, by-product gas such as LD gas (LD converter gas) generated in a converter, and M gas (mixed gas) obtained by mixing these by-product gases and adjusting a heat quantity are used in factories or power generation facilities. In a case where a gas supply amount is insufficient with respect to a factory demand (for example, a demand amount in a heating furnace of a rolling mill), it is supplemented with city gas to satisfy the factory demand. In addition, in a case where the gas supply amount to power generation facilities is insufficient with respect to a predetermined amount, it is supplemented with heavy oil. These supplemental fuels cost depending on the amount used. On the other hand, in a case where the gas supply amount is excessive with respect to the factory demand, the gas is detoxified by combustion and then released into the atmosphere, but this leads to energy loss and carbon dioxide emission and thus should be minimized.

In order to reduce the cost and suppress the release, it is necessary to use a gas holder that is a storage facility for by-product gases or to appropriately adjust the gas distribution amount. As an example, in a gas holder, in a situation where the supply amount of by-product gases is larger than the demand amount, the storage amount (gas holder level) of the by-product gases is increased by storing the by-product gases in the gas holder in preference to releasing, thereby suppressing the release. On the other hand, in a situation where the demand amount for by-product gases is larger than the supply amount, the stored gas is discharged from the gas holder to satisfy the demand, thereby reducing the amount of supplementary fuel used. In addition, in a case where the demand amount of by-product gases is further larger than the supply amount, the output of power generation facilities is reduced. Moreover, in a case where it is still not possible to deal with the problem, the running level of the factory may be lowered.

Steam is supplied by operations such as steam extraction from an exhaust heat recovery boiler from LD gas or a sintering furnace, a boiler of a coke drying quenching (CDQ) facility, and a turbine middle stage of a power generation facility (operation of obtaining steam from a turbine middle stage, the power generation amount is reduced) and is used in a factory (acid pickling tank heating in a cold rolling factory or a vacuum degassing facility). For an amount in shortage with respect to the steam demand, purchase is made from an external party. In addition, the power demand of the factory is satisfied by the amount of power generation in the CDQ, a top-pressure recovery turbine (TRT), and power generation facilities and power purchase from an electric power company. The amount of power purchased needs to be managed so as not to exceed the contract amount per hour (upper limit of the amount of power purchased). In addition, since the power purchase unit price varies depending on hours of the day, in a case where it is in hours when the unit price is high and there is an excess in the by-product gas supply amount, the operation conditions that minimize the cost varies depending on hours of the day or the supply and demand situation, such as setting the output of the power generation facilities high to reduce the power purchase amount.

From such a background, technology for minimizing energy operation cost in an iron mill has been proposed (see Patent Literatures 1 and 2 and Non-Patent Literature 1).

CITATION LIST

Patent Literature

Patent Literature 1: Japanese Patent No. 5862839
Patent Literature 2: JP 2004-171548 A

Non Patent Literature

Non Patent Literature 1: Yujiao Zeng, Xin Xiao, Jie Li, Li Sun, Christodoulos A. Floudas, Hechang Li, "A novel multi-period mixed-integer linear optimization model for optimal distribution of byproduct gases, steam and power in an iron and steel plant", Energy. 2018, vol. 143, p. 881-899.

SUMMARY

Technical Problem

All of the technology described in Patent Literatures 1 and 2 and Non-Patent Literature 1 solve a mixed integer programming problem suitable for appropriately describing the operation condition or running rules of a plant in order to obtain the optimal energy operating condition of an iron mill or a plant. This mixed integer programming problem includes both a continuous variable and an integer variable in a decision variable vector (a variable vector obtained by searching). Here, each element of the decision variable vector is a variable indicating an energy operating condition such as gas distribution or steam distribution. As a solution to this problem, a branch and bound method, which is an explicit solution technique, is often used, but the branch and bound method is a method of efficiently searching for an optimal solution by not searching for a candidate of a solution with which the cost is unlikely to be improved even the search is performed. Then, the search is ended when a cost difference between an executable solution satisfying all the constraint conditions and a relaxed continuous solution (solution when a part of the integer variable is relaxed to a continuous variable) becomes equal to or less than a certain threshold value in the process of the search.

However, although the branch and bound method is basically an efficient search method, the calculation time varies depending on the structure or the scale of the problem, and a satisfactory solution may not be obtained within a set time in some cases. This is problematic particularly in an energy operation system that is required to obtain an optimal solution at constant periods. The technology described in Patent Literatures 1 and 2 and Non-Patent Literature 1 relate to a formulation method for improving the quality of a solution, and no formulation method for shortening the calculation time has been studied. In particular, there is a disadvantage that the number of decision variables increases and the calculation time increases in a case where a plurality of factories and power generation facilities are included as in an iron mill and running rules thereof are complicated.

The present invention has been made in view of the above disadvantages, and an object of the present invention is to provide an optimal calculation method and an optimal calculation device of the energy operating condition in an iron mill capable of shortening a time required for optimal calculation of the energy operating condition in the iron mill. Another object of the present invention is to provide a running method of an iron mill capable of running the iron mill under the optimal energy operating condition.

Solution to Problem

An optimal calculation method of an energy operating condition in an iron mill according to the present invention includes: calculating, using a total energy operation cost of the iron mill within a predetermined period of time from a current time as an evaluation function, an operation condition of an energy facility in the iron mill as a decision variable such that a value of the evaluation function decreases, at each predetermined time within the predetermined period of time, based on actual values and estimated values of a generation amount and a used amount of energy utility for each of factories comprised in the iron mill, wherein the method includes a step of calculating the decision variable by imposing an equality constraint such that the decision variable related to a power generation facility included in the energy facility is constant within a predetermined aggregation time.

The energy utility for each of the factories may include gas, steam, and electric power.

The energy facility may include a mixed gas production facility, a gas holder, a coke drying quenching facility, a top-pressure recovery turbine facility, and a power generation facility that uses by-product gas, heavy oil, or steam extraction.

The total energy operation cost may include a cost associated with use of heavy oil, city gas, and steam and a cost associated with purchase of electricity.

An optimal calculation device of an energy operating condition in an iron mill according to the present invention calculates, using a total energy operation cost of the iron mill within a predetermined period of time from a current time as an evaluation function, an operation condition of an energy facility in the iron mill as a decision variable such that a value of the evaluation function decreases, at each predetermined time within the predetermined period of time, based on actual values and estimated values of a generation amount and a used amount of energy utility for each of factories comprised in the iron mill, and includes a calculator configured to calculate the decision variable by imposing an equality constraint so that the decision variable related to a power generation facility included in the energy facility is constant within a predetermined aggregation time.

An operating method of an iron mill according to the present invention includes a step of operating the iron mill based on the decision variable calculated by the optimal calculation method of an energy operating condition in an iron mill according to the present invention.

Advantageous Effects of Invention

According to the optimal calculation method and the optimal calculation device of the energy operating condition in an iron mill of the present invention, a time required for the optimal calculation of the energy operating condition in the iron mill can be shortened. In addition, according to the running method of an iron mill according to the present invention, the iron mill can be run under the optimal energy operating condition.

DESCRIPTION OF EMBODIMENTS

Hereinafter, an optimal calculation device of the energy operating condition in an iron mill as an embodiment of the present invention will be described with reference to the drawings.

[Configuration]

First, with reference to FIG. 1, a configuration of the optimal calculation device of the energy operating condition in an iron mill as an embodiment of the present invention will be described.

Figure 1:
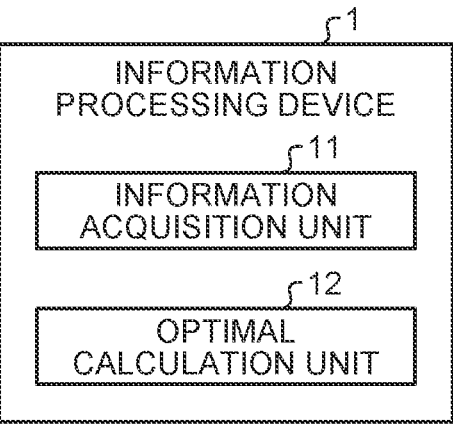
FIG. 1 is a block diagram illustrating a configuration of an optimal calculation device of the energy operating condition in an iron mill as an embodiment of the present invention.

FIG. 1 is a block diagram illustrating the configuration of the optimal calculation device of the energy operating condition in an iron mill according to the embodiment of the present invention. As illustrated in FIG. 1, the optimal calculation device of the energy operating condition in an iron mill as an embodiment of the present invention includes an information processing device 1 such as a workstation. The optimal calculation device of the energy operating condition in an iron mill as an embodiment of the present invention functions as an information acquisition unit 11 and an optimal calculation unit 12 when an arithmetic processing device inside the information processing device 1 executes a computer program. The functions of these units will be described later.

The optimal calculation device having such a configuration shortens the time required for optimal calculation of the energy operating condition in an iron mill by executing the following optimal calculation processing. Hereinafter, the operation of the optimal calculation device when executing the optimal calculation processing will be described with reference to FIGS. 2 and 3.

[Optimal Calculation Processing]

Figure 2:
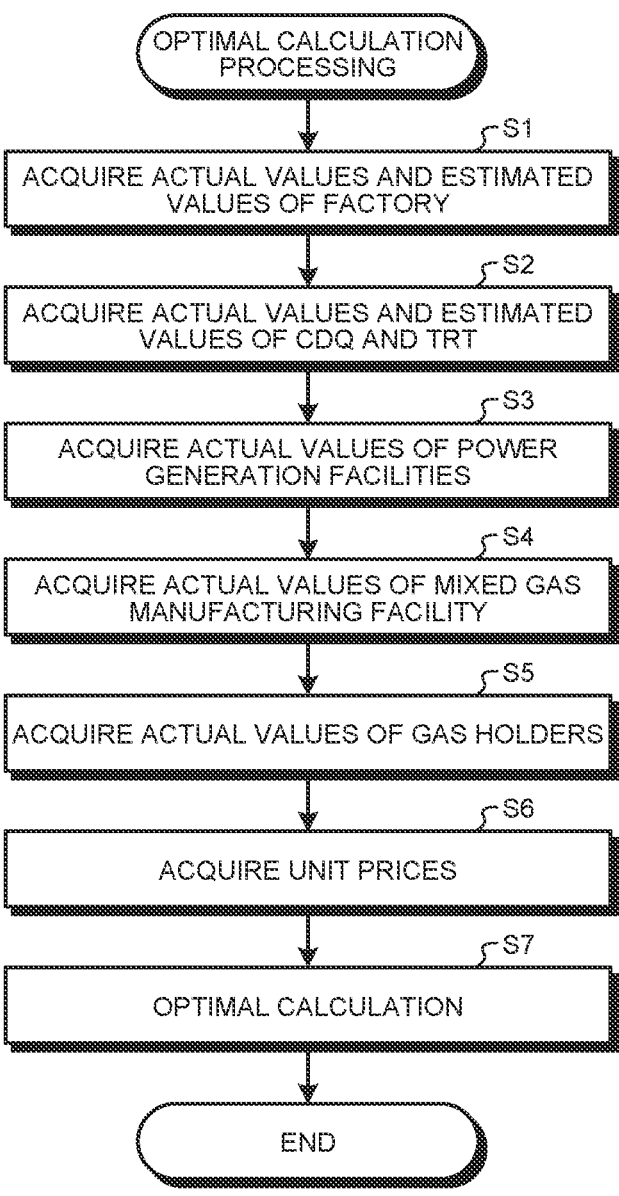
FIG. 2 is a flowchart illustrating a flow of optimal calculation processing as an embodiment of the present invention.
Figure 3:
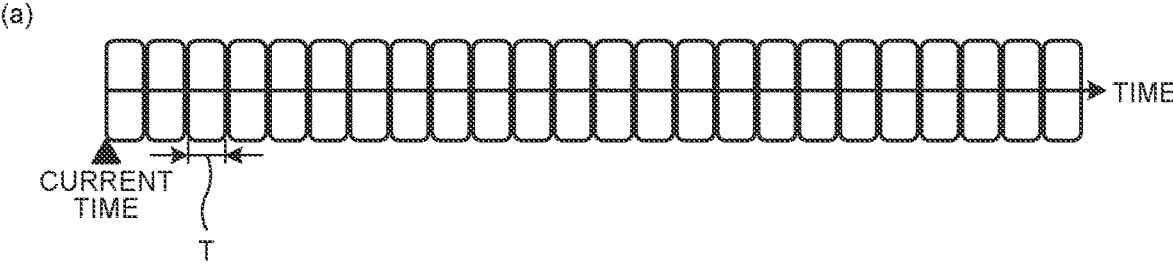
FIG. 3 is a diagram for explaining the aggregation constraint condition for decision variables.
Figure 3:
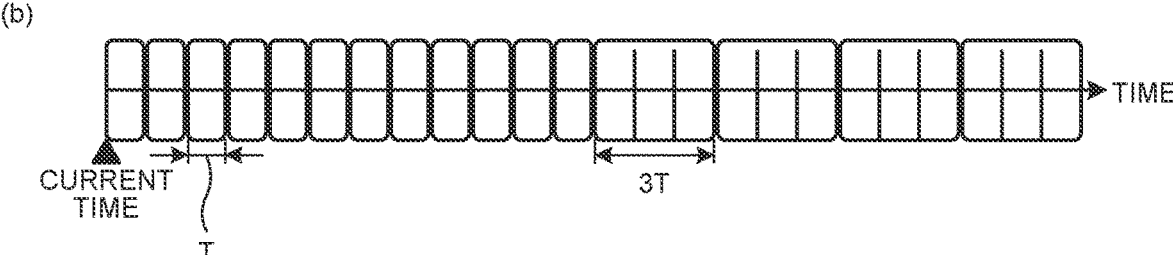

FIG. 2 is a flowchart illustrating a flow of the optimal calculation processing as an embodiment of the present invention. The flowchart illustrated in FIG. 2 starts at timing when an execution command of the optimal calculation processing is input to the information processing device 1, and the optimal calculation processing proceeds to the processing of step S1.

In the processing of step S1, the information acquisition unit 11 acquires data of actual values and estimated values of the generation amount and the consumption amount of energy utility of a factory in the iron mill at the current time (t=0) as input data of the optimal calculation processing. Specifically, as illustrated in Table 1 below, the information acquisition unit 11 acquires data of actual values $S_B(0)$, $S_C(0)$, $S_L(0)$, and $S_{St}(0)$ and estimated values $S_B(k)$, $S_C(k)$, $S_L(k)$, and $S_{St}(k)$ (k=1 to N) of the generation amounts of the B gas, the C gas, the LD gas, and the steam as data of the actual values and the estimated values of the generation amount of the energy utility at the current time. In addition, as illustrated in Table 2 below, the information acquisition unit 11 acquires data of actual values $D_B(0)$, $D_C(0)$, $D_L(0)$, $D_M(0)$, $D_{St}(0)$, and $D_E(0)$ and estimated values $D_B(k)$, $D_C(k)$, $D_L(k)$, $D_M(k)$, $D_{St}(k)$, and $D_E(k)$ (k=1 to N) of consumption amounts of the B gas, the C gas, the LD gas, the M gas, the steam, and the power as the data of actual values and estimated values of consumption amounts of energy utility at the current time. Each of the estimated values is obtained by estimating the generation amount and the used amount of the energy utility of each factory on the basis of the production plan of each factory in the iron mill. The production plan includes a long-term plan of about one week in addition to a short-term plans of several hours and one to two days from the present point of time, and the accuracy becomes higher for the short-term production plans. Therefore, estimated values obtained using the production plans also have a similar tendency of accuracy. With the above, the processing of step S1 is completed, and the optimal calculation processing proceeds to the processing of step S2.

TABLE 1

| Item | Actual Value (Current Time) | Estimated Value | | |
|---|---|---|---|---|
| | | k = 1 | k = 2 | ... k = N |
| B Gas Generation Amount (Blast Furnace Total Value) | $S_B(0)$ | $S_B(1)$ | $S_B(2)$ | ... $S_B(N)$ |
| C Gas Generation Amount (Coke Oven Total Value) | $S_C(0)$ | $S_C(1)$ | $S_C(2)$ | ... $S_C(N)$ |
| LD Gas Generation Amount (Converter Total Value) | $S_L(0)$ | $S_L(1)$ | $S_L(2)$ | ... $S_L(N)$ |
| Steam Generation Amount (Factory Total Value) | $S_{St}(0)$ | $S_{St}(1)$ | $S_{St}(2)$ | ... $S_{St}(N)$ |

TABLE 2

| Item | Actual Value (Current Time) | Estimated Value | | |
|---|---|---|---|---|
| | | k = 1 | k = 2 | ... k = N |
| B Gas Consumption Amount (Factory Total Value) | $D_B(0)$ | $D_B(1)$ | $D_B(2)$ | ... $D_B(N)$ |

TABLE 2-continued

| Item | Actual Value (Current Time) | Estimated Value | | |
|---|---|---|---|---|
| | | k = 1 | k = 2 | ... k = N |
| C Gas Consumption Amount (Factory Total Value) | $D_C(0)$ | $D_C(1)$ | $D_C(2)$ | ... $D_C(N)$ |
| LD Gas Consumption Amount (Factory Total Value) | $D_L(0)$ | $D_L(1)$ | $D_L(2)$ | ... $D_L(N)$ |
| M Gas Consumption Amount (Factory Total Value) | $D_M(0)$ | $D_M(1)$ | $D_M(2)$ | ... $D_M(N)$ |
| Steam Consumption Amount (Factory Total Value) | $D_{St}(0)$ | $D_{St}(1)$ | $D_{St}(2)$ | ... $D_{St}(N)$ |
| Electric Power Consumption Amount (Factory Total Value) | $D_E(0)$ | $D_E(1)$ | $D_E(2)$ | ... $D_E(N)$ |

In the processing of step S2, as illustrated in Table 3 below, the information acquisition unit 11 acquires data of actual values $S_{StCDQ}(0)$ and $S_{ETRT}(0)$ and estimated values $S_{StCDQ}(k)$ and $S_{ETRT}(k)$ (k=1 to N) of the CDQ boiler steam amount and the TRT power generation amount at the current time as input data for the optimal calculation processing. As a result, the processing of step S2 is completed, and the optimal calculation processing proceeds to the processing of step S3.

TABLE 3

| Item | Actual Value (Current Time) | Estimated Value | | |
|---|---|---|---|---|
| | | k = 1 | k = 2 | ... k = N |
| CDQ Boiler Steam (All Units) | $S_{StCDQ}(0)$ | $S_{StCDQ}(1)$ | $S_{StCDQ}(2)$ | ... $S_{StCDQ}(N)$ |
| TRT Power Generation Amount (All Units) | $S_{ETRT}(0)$ | $S_{ETRT}(1)$ | $S_{ETRT}(2)$ | ... $S_{ETRT}(N)$ |

In the processing of step S3, the information acquisition unit 11 acquires data of actual values of the amount of fuel used in all the power generation facilities in the iron mill at the current time. Specifically, in general, the M gas obtained by mixing by-product gases and adjusting the heat quantity is used in addition to the B gas, the C gas, and the LD gas as fuel in an iron mill. In addition, when a predetermined power generation amount cannot be ensured, using heavy oil or steam extraction from a CDQ turbine may be performed. Therefore, as illustrated in Table 4 below, the information acquisition unit 11 acquires data of actual values $D_{BxU}(0)$, $D_{CxU}(0)$, $D_{LxU}(0)$, $D_{MxU}(0)$, $D_{OxU}(0)$, $S_{StxU}(0)$ (x represents the identification number of a power generation facility) of amounts of the B gas, the C gas, the LD gas, the M gas, heavy oil, and extracted steam used in all power generation facilities in the iron mill at the current time. As a result, the processing of step S3 is completed, and the optimal calculation processing proceeds to the processing of step S4.

TABLE 4

| Unit Number | B Gas | C Gas | LD gas | M Gas | Heavy Oil | Extracted Steam Amount |
|---|---|---|---|---|---|---|
| Unit 1 | $D_{B1U}(0)$ | $D_{C1U}(0)$ | $D_{L1U}(0)$ | $D_{M1U}(0)$ | $D_{O1U}(0)$ | $D_{St1U}(0)$ |
| Unit 2 | $D_{B2U}(0)$ | $D_{C2U}(0)$ | $D_{L2U}(0)$ | $D_{M2U}(0)$ | $D_{O2U}(0)$ | $D_{St2U}(0)$ |
| . | . | . | . | . | . | . |
| . | . | . | . | . | . | . |
| . | . | . | . | . | . | . |
| Unit x | $D_{BxU}(0)$ | $D_{CxU}(0)$ | $D_{LxU}(0)$ | $D_{MxU}(0)$ | $D_{OxU}(0)$ | $D_{StxU}(0)$ |

In the processing of step S4, as illustrated in Table 5 below, the information acquisition unit 11 acquires data of actual values $D_{BPow}(0)$, $D_{CPow}(0)$, $D_{LPow}(0)$, and $D_{TPow}(0)$ of the amounts of the B gas, the C gas, the LD gas, and the city gas at the current time in a mixed gas manufacturing facility that supplies the M gas to the power generation facilities in the iron mill. In addition, as illustrated in Table 5 below, the information acquisition unit 11 acquires data of actual values $D_{BMill}(0)$, $D_{CMill}(0)$, $D_{LMill}(0)$, and $D_{TMill}(0)$ of the amounts of the B gas, the C gas, the LD gas, and the city gas at the current time in the mixed gas manufacturing facility that supplies the M gas to the factories in the iron mill. With the above, the processing of step S4 is completed, and the optimal calculation processing proceeds to the processing of step S5.

TABLE 5

| Item | B Gas | C Gas | LD Gas | City Gas |
|---|---|---|---|---|
| M Gas for Power Generation Facilities | $D_{BPow}(0)$ | $D_{CPow}(0)$ | $D_{LPow}(0)$ | $D_{TPow}(0)$ |
| M Gas for Factories | $D_{BMill}(0)$ | $D_{CMill}(0)$ | $D_{LMill}(0)$ | $D_{TMill}(0)$ |

In the processing of step S5, as illustrated in Table 6 below, the information acquisition unit 11 acquires data of gas storage amounts $H_{BLevel}(0)$, $H_{CLevel}(0)$, and $H_{LLevel}(0)$ and actual values $H_B(0)$, $H_C(0)$, and $H_L(0)$ of the intake amount and discharge amount of gas holders for the B gas, the C gas, and the LD gas at the current time. With the above, the processing of step S5 is completed, and the optimal calculation processing proceeds to the processing of step S6.

TABLE 6

| Item | Storage Amount | Actual Intake and Discharge |
|---|---|---|
| B Gas Holder | $H_{BLevel}(0)$ | $H_B(0)$ |
| C Gas Holder | $H_{CLevel}(0)$ | $H_C(0)$ |
| LD Gas Holder | $H_{LLevel}(0)$ | $H_L(0)$ |

In the processing of step S6, the information acquisition unit 11 acquires data of a unit price set value necessary for calculating the cost for energy operation of the iron mill. Specifically, as illustrated in Table 7 below, the information acquisition unit 11 acquires data of actual values $C_{Ele}(0)$, $C_{St}(0)$, $C_O(0)$, and $C_T(0)$ and future contract values $C_{Ele}(k)$, $C_{St}(k)$, $C_O(k)$, and $C_T(k)$ (k=1 to N) of unit prices of the electric power, steam, heavy oil, and city gas at the current time. With the above, the processing of step S6 is completed, and the optimal calculation processing proceeds to the processing of step S7.

TABLE 7

| Item | Actual Value (Current Time) | Contract Value | | | |
|---|---|---|---|---|---|
| | | k = 1 | k = 2 | . . . | k = N |
| Unit Price of Electric Power (Yen/kWh) | $C_{Ele}(0)$ | $C_{Ele}(1)$ | $C_{Ele}(2)$ | . . . | $C_{Ele}(N)$ |
| Unit Price of Steam (Yen/ton) | $C_{St}(0)$ | $C_{St}(1)$ | $C_{St}(2)$ | . . . | $C_{St}(N)$ |
| Unit Price of Heavy Oil (Yen/GJ) | $C_O(0)$ | $C_O(1)$ | $C_O(2)$ | . . . | $C_O(N)$ |
| Unit Price of City Gas (Yen/GJ) | $C_T(0)$ | $C_T(1)$ | $C_T(2)$ | . . . | $C_T(N)$ |

In the processing of step S7, the optimal calculation unit 12 uses the data acquired in the processing of steps S1 to S6 and executes the optimal calculation for obtaining the condition for minimizing the cost for the energy operation of the iron mill in a predetermined period (k=1 to N) from the current time. Specifically, the decision variables (variables searched in order to minimize the cost) in the optimal calculation are the amounts of the B gas, the C gas, the LD gas, the M gas, the heavy oil, and the steam extraction used in the power generation facilities illustrated in Table 8 below, the amounts of the B gas, the C gas, the LD gas, and the city gas in the mixed gas manufacturing facility $D_{BPow}(k)$, $D_{CPow}(k)$, $D_{LPow}(k)$, $D_{TPow}(k)$, $D_{BMill}(k)$, $D_{CMill}(k)$, $D_{LMill}(k)$, and $D_{TMill}(k)$ illustrated in Table 9 below, the gas storage amounts $H_{BLevel}(k)$, $H_{CLevel}(k)$, $H_{LLevel}(k)$ and the intake amounts and the discharge amounts $H_B(k)$, $H_C(k)$, $H_L(k)$ of the gas holders illustrated in Table 10, the amount of power purchased $S_{EPurchase}(k)$, the amount of steam extraction $S_{StExtCDQ}(k)$ from the CDQ turbine, and the amount of steam purchased $S_{StPurchase}(k)$

TABLE 8

| Unit Number | B Gas | C Gas | LD Gas | M Gas | Heavy Oil | Extracted Steam Amount |
|---|---|---|---|---|---|---|
| Unit 1 | $D_{B1U}(k)$ | $D_{C1U}(k)$ | $D_{L1U}(k)$ | $D_{M1U}(k)$ | $D_{O1U}(k)$ | $D_{St1U}(k)$ |
| Unit 2 | $D_{B2U}(k)$ | $D_{C2U}(k)$ | $D_{L2U}(k)$ | $D_{M2U}(k)$ | $D_{O2U}(k)$ | $D_{St2U}(k)$ |
| . | . | . | . | . | . | . |
| . | . | . | . | . | . | . |
| . | . | . | . | . | . | . |
| Unit x | $D_{BxU}(k)$ | $D_{CxU}(k)$ | $D_{LxU}(k)$ | $D_{MxU}(k)$ | $D_{OxU}(k)$ | $D_{StxU}(k)$ |

TABLE 9

| Item | B Gas | C Gas | LD Gas | City Gas |
|---|---|---|---|---|
| M Gas for Power Generation Facilities | $D_{BPow}(k)$ | $D_{CPow}(k)$ | $D_{LPow}(k)$ | $D_{TPow}(k)$ |
| M Gas for Factories | $D_{BMill}(k)$ | $D_{CMill}(k)$ | $D_{LMill}(k)$ | $D_{TMill}(k)$ |

TABLE 10

| Item | Storage Amount | Intake and Discharge Amount |
|---|---|---|
| B Gas Holder | $H_{BLevel}(k)$ | $H_B(k)$ |
| C Gas Holder | $H_{CLevel}(k)$ | $H_C(k)$ |
| LD Gas Holder | $H_{LLevel}(k)$ | $H_L(k)$ |

Meanwhile, the cost to be minimized is the sum of heavy oil as a supplemental fuel, city gas, steam, and the amount of power purchased. Each unit price is as illustrated in Table 7, and a total value f of the cost from the current time to N periods ahead is described using the unit prices as expressed in the following formula (1). In addition, the following constraint conditions (a) to (1) are set at the time of the optimal calculation. With the above, the processing of step S7 is completed, and a series of steps of the optimal calculation processing ends.

$$f = \sum_{k=1}^{N} \tag{1}$$

$$\left( C_{Ele}(k)S_{EPurchase}(k) + C_{St}(k)S_{StPurchase}(k) + C_O(k)\sum_{j=1}^{x} D_{OjU}(k) + C_T(k) \right.$$

$$\left. (D_{TPow}(k) + D_{TMill}(k)) \right)$$

(a) B Gas Balance Constraint $$S_B(k) = D_B(k) + \underbrace{D_{BPow}(k) + D_{BMill}(k)}_{For\,M\,gas} + \underbrace{\sum_{j=1}^{x} D_{BjU}(k)}_{\substack{for\,power\\generation\,facility}} + \underbrace{H_B(k)}_{\substack{intake\,amount\\of\,gas\,hold}} \tag{2}$$

(b) C Gas Balance Constraint $$S_C(k) = D_C(k) + \underbrace{D_{CPow}(k) + D_{CMill}(k)}_{For\,M\,gas} + \underbrace{\sum_{j=1}^{x} D_{CjU}(k)}_{\substack{for\,power\\generation\,facility}} + \underbrace{H_C(k)}_{\substack{intake\,amount\\of\,gas\,holder}} \tag{3}$$

(c) LD Gas Balance Constraint $$S_L(k) = D_L(k) + \underbrace{D_{LPow}(k) + D_{LMill}(k)}_{For\,M\,gas} + \underbrace{\sum_{j=1}^{x} D_{LjU}(k)}_{\substack{for\,power\\generation\,facility}} + \underbrace{H_L(k)}_{\substack{intake\,amount\\of\,gas\,holder}} \tag{4}$$

(d) Factory M Gas Balance Constraint $$D_M(k) = D_{BMill}(k) + D_{CMill}(k) + D_{LMill}(k) + D_{TMill}(k) \tag{5}$$

(e) Power Generation Facility M Gas Balance Constraint $$\sum_{J=1}^{x} D_{MjU}(k) = D_{BPow}(k) + D_{CPow}(k) + D_{LPow}(k) + D_{TPow}(k) \tag{6}$$

(f) Gas Holder Storage Amount $$H_{BLevel}(k) = H_{BLevel}(k-1) + H_B(k)T \tag{7-1}$$

$$H_{CLevel}(k) = H_{CLevel}(k-1) + H_C(k)T \tag{7-2}$$

$$H_{LLevel}(k) = H_{LLevel}(k-1) + H_L(k)T \tag{7-3}$$

Where T represents a fixed time interval.

(g) Power Generation Facility Model $$S_{E1U}(k) = f_1(D_{B1U}(k) + D_{C1U}(k) + D_{L1U}(k) + D_{M1U}(k) + D_{O1U}(k), \quad (8-1)$$
$$S_{St1U}(k))$$

$$S_{E2U}(k) = f_2(D_{B2U}(k) + D_{C2U}(k) + D_{L2U}(k) + D_{M2U}(k) + D_{O2U}(k), \quad (8-2)$$
$$S_{St2U}(k))$$

$$\vdots$$

$$S_{ExU}(k) = f_x(D_{BxU}(k) + D_{CxU}(k) + D_{LxU}(k) + D_{MxU}(k) + D_{OxU}(k), \quad (8-x)$$
$$S_{StxU}(k))$$

Where $f_n$ (n=1, 2, . . . , x) represents a power generation model having an input heat amount and a steam extraction amount of a power generation facility as arguments.

$$S_{ECDQ}(k) = f_{CDQ}(S_{StCDQ}(k), S_{StExtCDQ}(k)) \tag{9}$$

Here, $f_{CDQ}$ represents a power generation model having a boiler steam amount and a steam extraction amount of the CDQ as arguments.

(h) Power Balance Constraint $$D_E(k) = S_{ETRT}(k) + S_{ECDQ}(k) + \sum_{j=1}^{x} S_{EjU}(k) + S_{EPurchase}(k) \tag{10}$$

(i) Steam Balance Constraint

The steam generation amount and the steam consumption amount at time k (=1 to N) are equal.

$$D_{St}(k) = S_{St}(k)\sum_{j=1}^{x} S_{StjU}(k) + S_{StExtCDQ}(k) + S_{StPurchase}(k) \qquad (11)$$

(j) Upper and Lower Limits Constraint

An inequality constraining the upper and lower limits of a decision variable is set. For example, let a decision variable be V, an upper limit value thereof be $U_x$, and a lower limit value thereof be $L_x$, an inequality constraint expressed in the following formula (12) is obtained.

$$L_x \leq V(k) \leq U_x \qquad (12)$$

(k) Aggregation Constraint Condition for Decision Variables for Calculation Time Reduction A constraint is provided to shorten the calculation (search) time by aggregating decision variables after a specified time and searching with the same value. For example, in a case where the terminal time is T×24 periods ahead of the current time as illustrated in FIG. 3(a), a constraint is provided in which the specified time is aggregated in units of 3×T periods halfway after T×13 periods and search is performed with the same value during these periods as illustrated in FIG. 3(b). Specifically, in the process of creating the constraint condition corresponding to N periods from the current time, the following aggregation constraint is imposed when the following condition 1 and condition 2 are simultaneously satisfied with the specified time as being J and the aggregation number as being n (natural number). Note that, in the present embodiment, the aggregation constraint condition is imposed on decision variables related to the power generation facilities. This is because it is difficult to make changes for a supply and demand facility of a factory since the supply and demand plan is set, whereas it is easy to change the operation condition of a power generation facility. In addition, it is preferable to set the designated time at a time after a time at which the accuracy of a production plan that an operator wants to know as reference information becomes relatively low.

(Condition 1) After the designated time J, equal to or less than the final time N. That is, J+1≤t≤N holds.

(Condition 2) Remainder determination (t−J) mod n=1 holds. This is a condition that the remainder obtained when (t−J) is divided by n is 1.

(Aggregation Constraint) An equality constraint V(t)=V(l) is set for l=t+1, . . . , min(t+n−1, N).

(1) Change Rate Constraint

In the case of defining the change rate, if the upper limit value is denoted by $U_v$ and the lower limit value is denoted by $L_v$, inequality constraints expressed in the following formulas (13) and (13)' are obtained.

$$k=1,2, \ldots ,J \text{ where, } L_v \leq (V(k)-V(k-1))/T \leq U_v \qquad (13)$$

$$k=J+1, \ldots ,N \text{ where, } n\,L_v \leq (V(k)-V(k-1))/T \leq nU_v \qquad (13)'$$

Here, formula (13)' is necessary for increasing the change rate depending on the aggregation number n of the decision variable and thereby providing a change rate equivalent to that at a time at which the aggregation is not performed.

EXAMPLES

Figure 4:
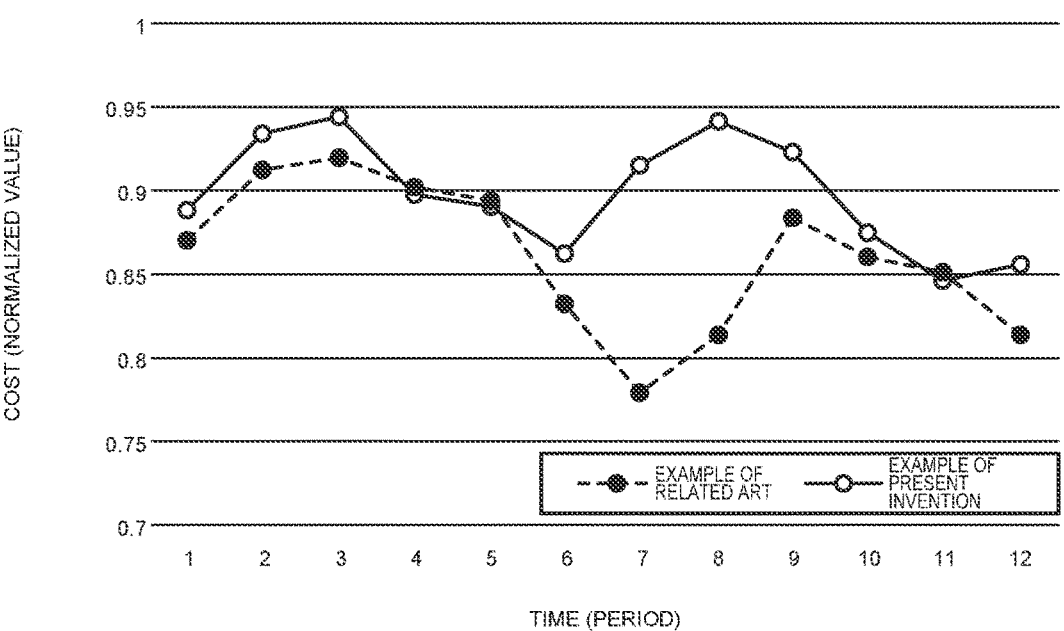
FIG. 4 is a graph illustrating changes in cost in an example of the present invention and a comparative example.
Figure 5:
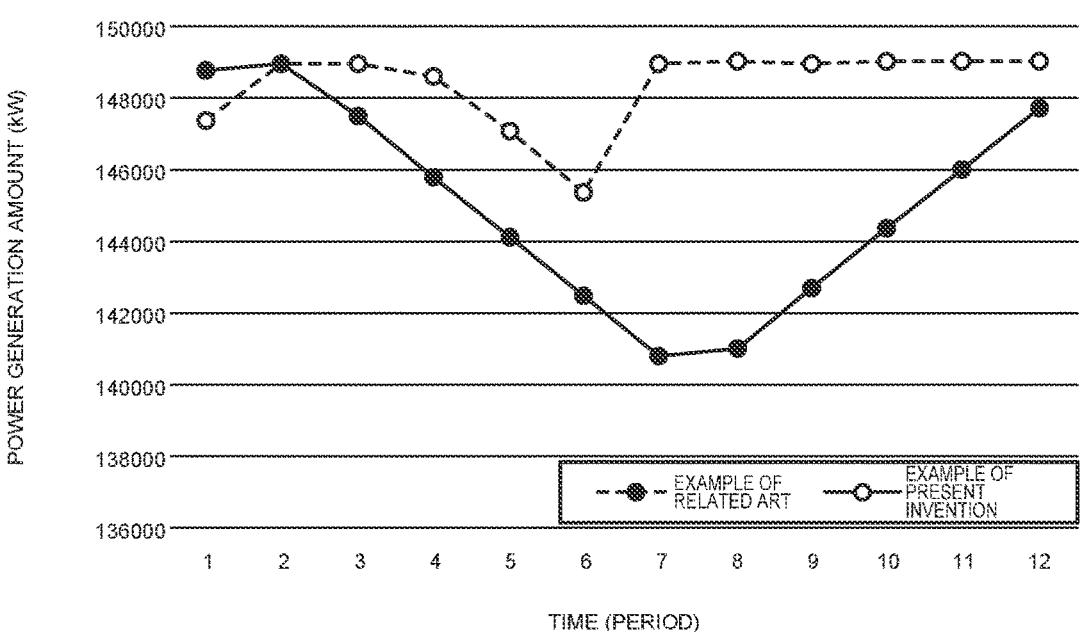
FIG. 5 is a graph illustrating changes in electric power generation in the example of the present invention and the comparative example.

In an example of the invention, the terminal time is twelve periods ahead (one period lasts five minutes), and the optimal calculation was performed by setting the aggregation number to 6 after 7 periods for a plurality of decision variables representing the amount of fuel used at a plurality of power generation facilities, whereas in a conventional example, although the terminal time is twelve periods ahead, the optimal calculation was performed without performing aggregation, and the both results were compared. Note that calculation conditions for the both are the same except for whether or not decision variables are aggregated (cost unit price, supply and demand measurement values, etc. Processing of steps S1 to S6 illustrated in FIG. 2), and the same computer was used for both calculations. As a result, the ratio of the calculation times between the conventional example and the example of the invention (=present example/conventional example) was about 0.90, and a 10% reduction in calculation time was achieved. This can be said to be an effect of the constraint condition in which the decision variables are aggregated in the present example. At this point, as illustrated in FIG. 4, the cost was almost equivalent to that of the conventional example up to the sixth period, and the cost of the present example became higher than that of the conventional example at and after the seventh period for which the aggregation was performed. This is because the search range is constrained by the aggregation of decision variables so that the power generation amount at and after the seventh period becomes a constant value as illustrated in FIG. 5, for example. Meanwhile, a utilization method is presumed in which the optimal calculation is executed at constant periods and the operator follows the calculation result of the time before the aggregation is performed and refers as reference values to the time after the aggregation is performed, and thus the influence on the cost is minor.

Although the embodiments to which the invention made by the present inventors is applied have been described above, the present invention is not limited by the description and the drawings included as a part of the disclosure of the present invention according to the present embodiments. That is, other embodiments, examples, operation techniques, and the like made by those skilled in the art on the basis of the present embodiment are all included in the scope of the present invention.

INDUSTRIAL APPLICABILITY

According to the present invention, it is possible to provide an optimal calculation method and an optimal calculation device of the energy operating condition in an iron mill capable of shortening a time required for optimal calculation of the energy operating condition in the iron mill. In addition, according to the present invention, it is possible to provide a running method of an iron mill capable of operating the iron mill under the optimal energy operating condition.

REFERENCE SIGNS LIST

1 INFORMATION PROCESSING DEVICE
11 INFORMATION ACQUISITION UNIT
12 OPTIMAL CALCULATION UNIT

The invention claimed is:

1. An operating method of an iron mill using an optimal calculation method of an energy operating condition in the iron mill, the optimal calculation method being executed by an information processing apparatus configured to perform a periodic optimization process for an energy management system of the iron mill, the operating method comprising:

defining time points, starting at a current time, within a predetermined period of time based on a predetermined cycle;

defining a total energy operation cost of the iron mill within the predetermined period of time as an evaluation function, calculating an operation condition of an energy facility in the iron mill as a decision variable based on actual values and estimated values of a generation amount and a used amount of energy utility for each of factories comprised in the iron mill, wherein the decision variable is calculated such that the evaluation function decreases over the predetermined period of time, and controlling the operation of the power generation facility in the iron mill based on the calculated decision variable, wherein the energy utility for each of the factories includes gas, steam, and electric power, the energy facility includes a mixed gas production facility, a gas holder, a coke drying quenching facility, a top-pressure recovery turbine facility, and a power generation facility that uses by-product gas, heavy oil, or steam extraction, the operation condition includes an amount of the by-product gas, the heavy oil or the steam extraction used in each power generation facility, or a storage amount or a discharge amount of the gas holder, a designated time in the predetermined period is defined, and a series of time points after the designated time within the predetermined period are set to an aggregation period, the calculating includes:

calculating the decision variable related to the power generation facility included in the energy facility at each of the time points from the current time to the designated time in the predetermined period, and within the aggregation period, calculating the decision variable by imposing an equality constraint such that the decision variable related to the power generation facility included in the energy facility is constant within the aggregation period.

2. The optimal calculation method of an energy operating condition in an iron mill according to claim 1, wherein the total energy operation cost includes a cost associated with use of heavy oil, city gas, and steam and a cost associated with purchase of electricity.

3. The operating method of an iron mill according to claim 1, wherein the calculating further comprises imposing a change rate constraint that allows the decision variable to change by a proportionally larger amount at the boundary of the aggregation period compared to changes between individual time points outside of the aggregation period.

4. The operating method of an iron mill according to claim 1, wherein the controlling the operation of the power generation facility includes controlling an amount of gas supplied within the iron mill.

* * * * *